United States Patent
Zhang et al.

(10) Patent No.: US 7,209,581 B2
(45) Date of Patent: Apr. 24, 2007

(54) SYSTEM AND METHOD FOR GROUND GLASS NODULE (GGN) SEGMENTATION

(75) Inventors: Li Zhang, Skillman, NJ (US); Ming Fang, Princeton Jct., NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 401 days.

(21) Appl. No.: 10/898,511

(22) Filed: Jul. 23, 2004

(65) Prior Publication Data

US 2005/0063578 A1 Mar. 24, 2005

Related U.S. Application Data

(60) Provisional application No. 60/503,602, filed on Sep. 17, 2003, provisional application No. 60/491,650, filed on Jul. 31, 2003.

(51) Int. Cl.
*G06K 9/00* (2006.01)

(52) U.S. Cl. ........................ 382/131; 382/173

(58) Field of Classification Search ............... 382/128, 382/131, 132, 173; 128/922
See application file for complete search history.

(56) References Cited

U.S. PATENT DOCUMENTS

| 6,138,045 | A * | 10/2000 | Kupinski et al. ............ 600/425 |
| 2003/0179915 | A1* | 9/2003 | Goto ............................ 382/128 |
| 2004/0086162 | A1* | 5/2004 | Doi et al. ..................... 382/131 |
| 2004/0120561 | A1* | 6/2004 | Goto ............................ 382/128 |

FOREIGN PATENT DOCUMENTS

WO  WO 2004/109580 A2 * 12/2004

OTHER PUBLICATIONS

Engeler et al., "Ground-Glass Opacity of the Lung Parenchyma: A Guide to Analysis with High-Resolution CT," *American Journal of Roentgenology*, vol. 160, No. 2, Feb. 1993, pp. 249-251.*
Jang et al., "Bronchioloalveolar Carcinoma: Focal Area of Ground-Glass Attenuation at Thin-Section CT as an Entry Sign," *Radiology*, vol. 1999, No. 2, May 1996, pp. 485-488.*
Collins et al., "Ground-Glass Opacity at CT: The ABCs," *American Journal of Roentgenology*, vol. 169, No. 2, Aug. 1997, pp. 355-367.*
Heitmann et al., "Automatic detection of ground glass opacities on lung HRCT using multiple neural networks," *European Radiology*, vol. 7, No. 9, Nov. 1997, pp. 1463-1472.*

(Continued)

*Primary Examiner*—Andrew W. Johns
(74) *Attorney, Agent, or Firm*—Donald B. Paschburg; F. Chau & Associates, LLC (57) ABSTRACT

A system and method for ground glass nodule (GGN) segmentation is provided. The method comprises: selecting a point in a medical image, wherein the point is located in a GGN; defining a volume of interest (VOI) around the point, wherein the VOI comprises the GGN; removing a chest wall from the VOI; obtaining an initial state for a Markov random field; and segmenting the VOI, wherein the VOI is segmented using the Markov random field.

32 Claims, 7 Drawing Sheets

OTHER PUBLICATIONS

Kuriyama et al., "Ground-Glass Opacity on Thin-Section CT: Value in Differentiating Subtypes of Adenocarcinoma of the Lung," *American Journal of Roentgenology*, vol. 173, No. 2, Aug. 1999, pp. 465-469.*

Watanabe et al., "Results of Wedge Resection for Focal Bronchioloalveolar Carcinoma Showing Pure Ground-Glass Attenuation on Computed Tomography," *Ann. Thorac. Surg.*, vol. 73, No. 4, Apr. 2002, pp. 1071-1075.*

Nagao et al., "Measurements of Localized Ground-Glass Attenuation on Thin-Section Compound Tomography Images: Correlation With the Progression of Bronchioloalveolar Carcinoma of the Lung," *Investigation Radiology*, vol. 37, No. 12, Dec. 2002, pp. 692-697.*

Tanino et al., "A Detection Method of Ground Glass Opacities in Chest X-ray CT Images using Automatic Clustering Techniques," *Proc. SPIE vol. 5032: Medical Imaging 2003: Image Processing*, Feb. 2003, pp. 1728-1737.*

Li Zhang, et al., "Consistent Interactive Segmentation of Pulmonary Ground Glass Nodules Identified in CT Studies," Proc. SPIE Int. Soc. Opt. Eng., vol. 5370, May 12, 2004 pp. 1709-1719 XP002302735.

Li Fan et al., "Automatic Detection of Lung Nodules from multi-slice low-dose CT images" Proceedings of the SPIE— the International Society for Optical Engineering SPIE-Int. Soc. Opt. Eng USA, vol. 4322, Jul. 3, 2001, pp. 1818-1835, XP002302736.

Choe S. M. et al. "Volumetric Object Reconstruction Using the 3D-MRF Model-Based Segmentation" IEEE Transactions On Medical Imaging, IEEE Inc. New York, US, vol. 16, No. 6, Dec. 1, 1997, pp. 887-892, XP000738200.

Li H. D. et al., "Markov Random Field For Tumor Detection In Digital Mammography," IEEE Transactions On Medical Imaging, IEEE Inc., New York, US, vol. 14, No. 3, Sep. 1, 1995, pp. 565-576, XP000527218.

Held K. et al., "Markov random field segmentation of brain MR images," IEEE Transactions On Medical Imaging IEEE USA, vol. 16, No. 6, Dec. 1997, pp. 878-886, XP002302737.

Takizawa H., et al. "Recognition of lung nodules from X-ray CT images using 3D Markov random field models," Pattern Recognition, 2002. Proceedings, 16th International Conference On Quebec City, Que., Canada Aug. 11-15, 2002, Los Alamitos, CA, USA, IEEE Comput. Soc, US, Aug. 11, 2002, pp. 99-102, XP010613284. International Search Report.

* cited by examiner

Pure GGN    Mixed GGN

10-connectivity 18-connectivity

SYSTEM AND METHOD FOR GROUND GLASS NODULE (GGN) SEGMENTATION

CROSS-REFERENCE TO RELATED APPLICATIONS

This application claims the benefit of U.S. Provisional Application No. 60/491,650, filed Jul. 31, 2003, a copy of which is herein incorporated by reference and claims the benefit of U.S. Provisional Application No. 60/503,602, filed Sep. 17, 2003.

BACKGROUND OF THE INVENTION

1. Technical Field

The present invention relates to nodule segmentation, and more particularly, to ground glass nodule (GGN) segmentation in pulmonary computed tomographic (CT) volumes using a Markov random field.

2. Discussion of the Related Art

Figure 1:
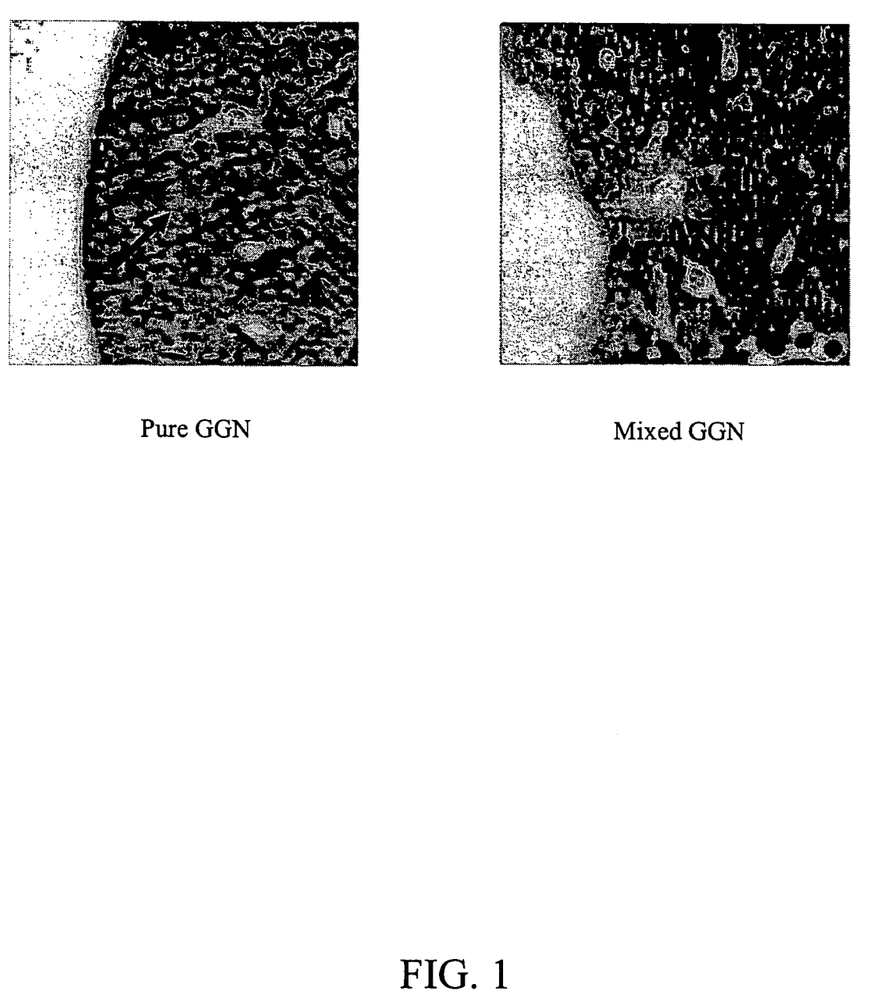
FIG. 1 illustrates a "pure" ground glass nodule (GGN) and a "mixed" GGN.

Ground glass nodules (GGNs) are, for example, radiographic appearances of hazy lung opacities not associated with an obscuration of underlying vessels. GGNs come in two forms, "pure" and "mixed" as shown in FIG. 1. Pure GGNs do not consist of any solid components, whereas mixed GGNs consist of some solid components.

GGNs are more clearly shown in high resolution computed tomographic (HRCT) images than plain radiographs. GGNs also appear differently than solid nodules in HRCT images because solid nodules have a higher contrast and well defined boundaries. In addition, the appearance of GGNs in HRCT images is a highly significant finding as they often indicate the presence of an active and potentially treatable process such as bronchiolalveolar carcinomas or invasive adenocarcinoma.

Because GGNs are typically associated with active lung disease, the presence of GGNs often leads to further diagnostic evaluation, including, for example, lung biopsy. Thus, a computer-based segmentation can be of assistance to medical experts for diagnosis and treatment of certain types of lung disease. Accordingly, there is a need for a system and method of computer-based segmentation that can be used to accurately and consistently segment GGNs for quick diagnosis.

SUMMARY OF THE INVENTION

The present invention overcomes the foregoing and other problems encountered in the known teachings by providing a system and method for ground glass nodule (GGN) segmentation.

In one embodiment of the present invention, a method for ground glass nodule (GGN) segmentation comprises: selecting a point in a medical image, wherein the point is located in a GGN; defining a volume of interest (VOI) around the point, wherein the VOI comprises the GGN; removing a chest wall from the VOI; obtaining an initial state for a Markov random field; and segmenting the VOI, wherein the VOI is segmented using the Markov random field. The method further comprises acquiring the medical image, wherein the medical image is acquired using a computed tomographic (CT) imaging technique.

The method further comprises: detecting the GGN using a computer-aided GGN detection technique; and detecting the GGN manually. The point is automatically or manually selected. The GGN is one of a pure GGN and a mixed GGN. The method further comprises defining one of a shape and a size of the VOI. The chest wall is removed by performing a region growing. The initial state for the Markov random field is obtained by performing a region growing on the VOI after the chest wall is removed.

The step of segmenting the VOI using the Markov random field comprises: defining a posteriori probability for the VOI; and labeling each pixel in the VOI using a maximum of the posteriori probability, wherein each pixel in the VOI is labeled as one of a GGN and a background. The defined posteriori probability is computed by $P(L|F) \propto P(F|L)P(L)$. The step of labeling each pixel is computed by $$l_{\bar{x}}(i) = \operatorname*{argmin}_{l \in \{g,b\}} \left\{ U(g, i-1) + \frac{1}{2\sigma^2}[f(\bar{x}) - \mu_g], U(b, i-1) + \frac{1}{2\sigma^2}[f(\bar{x}) - \mu_b] \right\},$$

wherein the labeling comprises scanning the VOI until a convergence is reached.

The method further comprises: performing a shape analysis to remove blood vessels attached to or near the GGN after the VOI has been segmented using the Markov random field; and displaying the VOI segmented using the Markov random field.

In another embodiment of the present invention, a system for GGN segmentation comprises: a memory device for storing a program; a processor in communication with the memory device, the processor operative with the program to: define a volume of interest (VOI) around a GGN using data associated with a medical image of a lung; remove a chest wall from the VOI; obtain an initial state for a Markov random field; and segment the VOI, wherein the VOI is segmented using the Markov random field. The processor is further operative with the program code to acquire the medical image, wherein the medical image is acquired using a CT imaging technique.

The chest wall is removed by performing a region growing. The initial state for the Markov random field is obtained by performing a region growing on the VOI after the chest wall is removed.

The processor is further operative with the program code when segmenting the VOI using the Markov random field to: define a posterirori probability for the VOI; and label each pixel in the VOI using a maximum of the posteriori probability, wherein each pixel in the VOI is labeled as one of a GGN and a background. The defined posteriori probability is computed by $P(L|F) \propto P(F|L)P(L)$. The step of labeling each pixel is computed by $$l_{\bar{x}}(i) = \operatorname*{argmin}_{l \in \{g,b\}} \left\{ U(g, i-1) + \frac{1}{2\sigma^2}[f(\bar{x}) - \mu_g], U(b, i-1) + \frac{1}{2\sigma^2}[f(\bar{x}) - \mu_b] \right\}.$$

The processor is further operative with the program code to: perform a shape analysis to remove blood vessels attached to the GGN in the VOI segmented using the Markov random field; and display the VOI segmented using the Markov random field, wherein the GGN is visible.

In yet another embodiment of the present invention, a computer program product comprising a computer useable medium having computer program logic recorded thereon for GGN segmentation, the computer program logic comprising: program code for selecting a point in a medical image, wherein the point is located in or near a GGN; program code for defining a VOI around the point, wherein the VOI comprises the GGN; program code for removing a chest wall from the VOI; program code for obtaining an initial state for a Markov random field; and program code for segmenting the VOI, wherein the VOI is segmented using the Markov random field.

In another embodiment of the present invention, a system for GGN segmentation comprises: means for selecting a point in a medical image, wherein the point is located in a GGN; means for defining a VOI around the point, wherein the VOI comprises the GGN; means for removing a chest wall from the VOI; means for obtaining an initial state for a Markov random field; and means for segmenting the VOI, wherein the VOI is segmented using the Markov random field.

In yet another embodiment of the present invention, a method for GGN segmentation in pulmonary CT volumes using a Markov random field comprises: selecting a GGN from data associated with a pulmonary CT volume; defining a VOI around the GGN; removing a chest wall from the VOI by performing a region growing on the VOI; obtaining an initial state for an iterated condition mode (ICM) procedure by segmenting the VOI after the chest wall is removed; and segmenting the VOI using a Markov random field, wherein the segmentation comprises: defining a posteriori probability for the VOI; and performing the ICM procedure, wherein the ICM procedure comprises labeling each pixel in the VOI using a maximum of the posteriori probability, wherein each pixel in the VOI is labeled as one of a GGN and a background until each pixel in the VOI is labeled.

The defined posteriori probability is computed by P(L|F) ∝P(F|L)P(L). The step of labeling each pixel during the ICM procedure is computed by $$l_{\bar{x}}(i) = \operatorname*{argmin}_{l \in \{g,b\}} \left\{ U(g, i-1) + \frac{1}{2\sigma^2}[f(\bar{x}) - \mu_g], U(b, i-1) + \frac{1}{2\sigma^2}[f(\bar{x}) - \mu_b] \right\}$$

wherein the ICM procedure begins from the initial state.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 2:
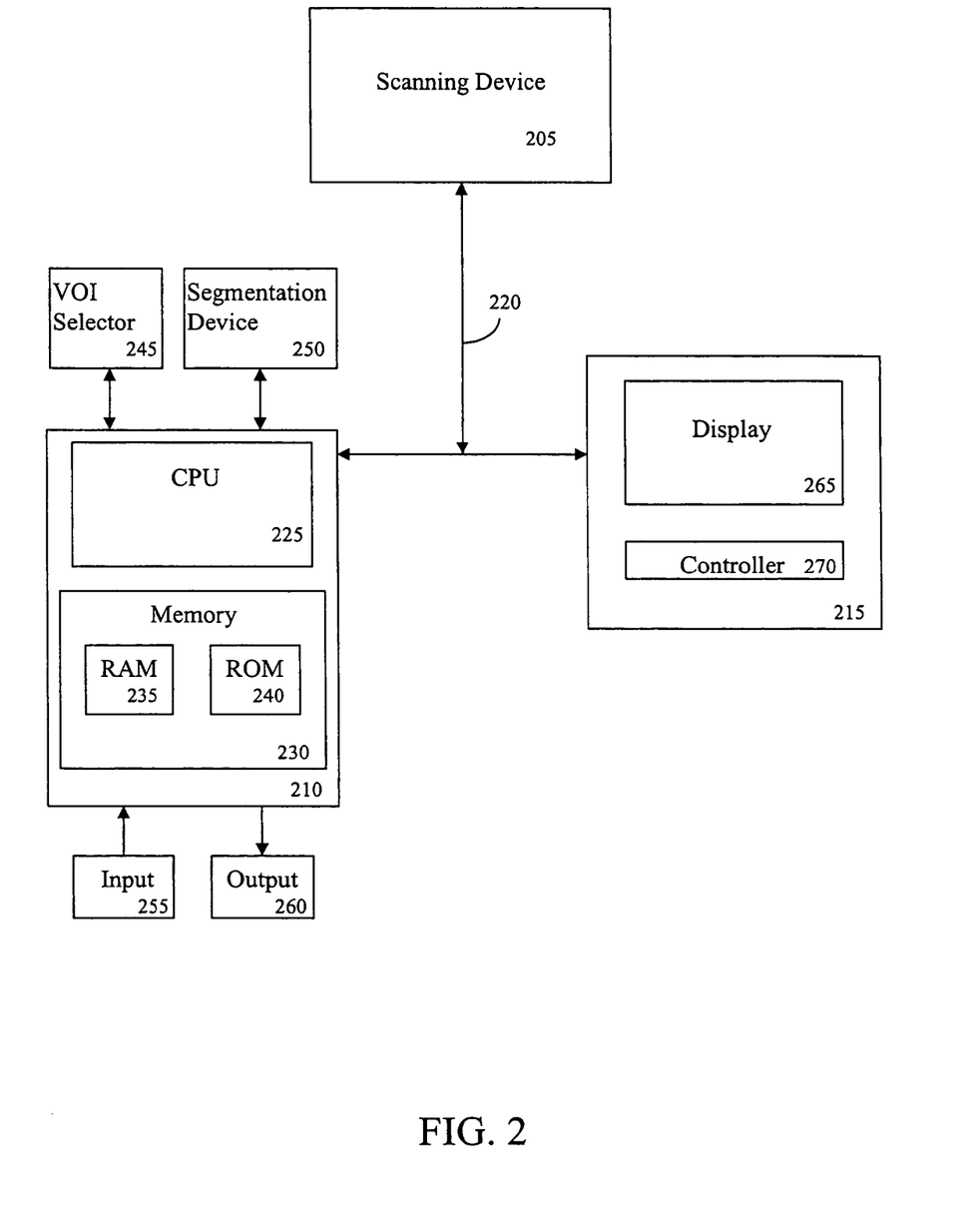
FIG. 2 is a block diagram of a system for GGN segmentation according to an exemplary embodiment of the present invention.

FIG. 2 is a block diagram of a system for ground glass nodule (GGN) segmentation according to an exemplary embodiment of the present invention. As shown in FIG. 2, the system includes, inter alia, a scanning device 205, a personal computer (PC) 210 and an operator's console and/or virtual navigation terminal 215 connected over, for example, an Ethernet network 220. The scanning device 205 is a high-resolution computed tomography (HRCT) imaging device.

The PC 210, which may be a portable or laptop computer, a personal digital assistant (PDA), etc., includes a central processing unit (CPU) 225 and a memory 230, which are connected to an input 255 and an output 260. The PC 210 is connected to a volume of interest (VOI) selector 245 and a segmentation device 250 that includes one or more methods for ground glass nodule (GGN) segmentation. The PC 210 may also be connected to and/or include a diagnostic module, which is used to perform automated diagnostic or evaluation functions of medical image data. In addition, the PC 210 may further be coupled to a lung volume examination device.

The memory 230 includes a random access memory (RAM) 235 and a read only memory (ROM) 240. The memory 230 can also include a database, disk drive, tape drive, etc., or a combination thereof. The RAM 235 functions as a data memory that stores data used during execution of a program in the CPU 225 and is used as a work area. The ROM 240 functions as a program memory for storing a program executed in the CPU 225. The input 255 is constituted by a keyboard, mouse, etc., and the output 260 is constituted by a liquid crystal display (LCD), cathode ray tube (CRT) display, printer, etc.

The operation of the system is controlled from the operator's console 215, which includes a controller 270, for example, a keyboard, and a display 265, for example, a CRT display. The operator's console 215 communicates with the PC 210 and the scanning device 205 so that 2D image data collected by the scanning device 205 can be rendered into 3D data by the PC 210 and viewed on the display 265. It is to be understood that the PC 210 can be configured to operate and display information provided by the scanning device 205 absent the operator's console 215, using, for example, the input 255 and output 260 devices to execute certain tasks performed by the controller 270 and display 265.

The operator's console 215 further includes any suitable image rendering system/tool/application that can process digital image data of an acquired image dataset (or portion thereof) to generate and display 2D and/or 3D images on the display 265. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 210 may also include an image rendering system/tool/application for processing digital image data of an acquired image dataset to generate and display 2D and/or 3D images.

As shown in FIG. 2, the segmentation device 250 is also used by the PC 210 to receive and process digital medical image data, which as noted above, may be in the form of raw image data, 2D reconstructed data (e.g., axial slices), or 3D reconstructed data-such as volumetric image data or multi-planar reformats, or any combination of such formats. The data processing results can be output from the PC 210 via the network 220 to an image rendering system in the operator's console 215 for generating 2D and/or 3D renderings of image data in accordance with the data processing results, such as segmentation of organs or anatomical structures, color or intensity variations, and so forth.

It is to be understood that the system and method according to the present invention for GGN segmentation may be implemented as extensions or alternatives to conventional segmentation methods used for processing medical image data. Further, it is to be appreciated that exemplary systems and methods described herein can be readily implemented with 3D medical images and computer-aided diagnosis (CAD) systems or applications that are adapted for a wide range of imaging modalities (e.g., CT, MRI, etc.) and for diagnosing and evaluating various abnormal pulmonary structures or lesions such as lung nodules, tumors, stenoses, inflammatory regions, etc. In this regard, although exemplary embodiments may be described herein with reference to particular imaging modalities or particular anatomical features, nothing should be construed as limiting the scope of the invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

Figure 3:
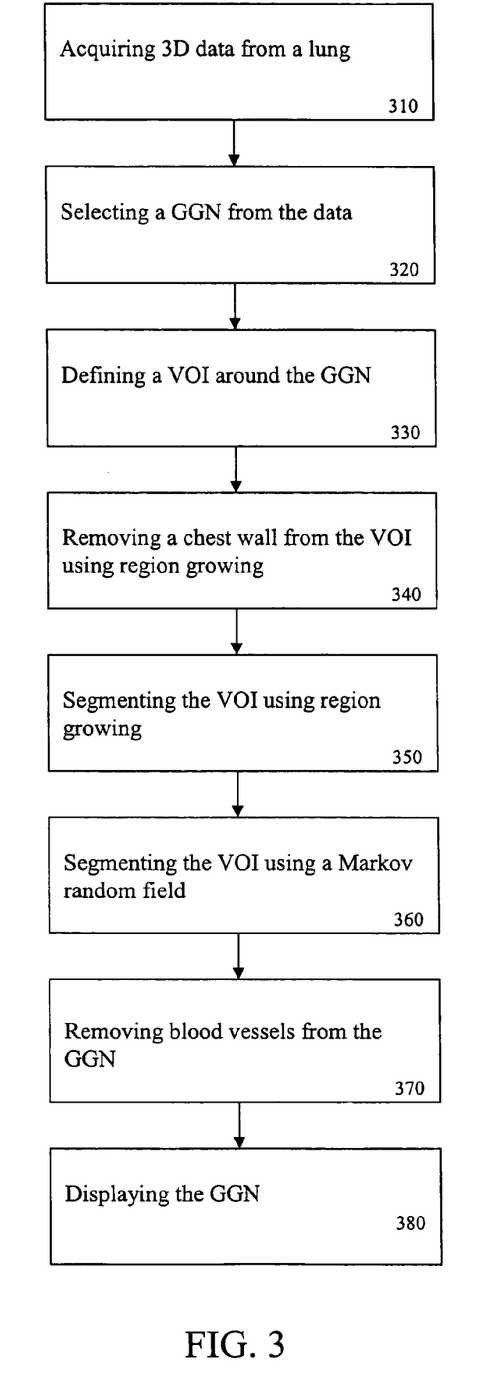
FIG. 3 is a flowchart illustrating a method for GGN segmentation according to an exemplary embodiment of the present invention.
Figure 7:
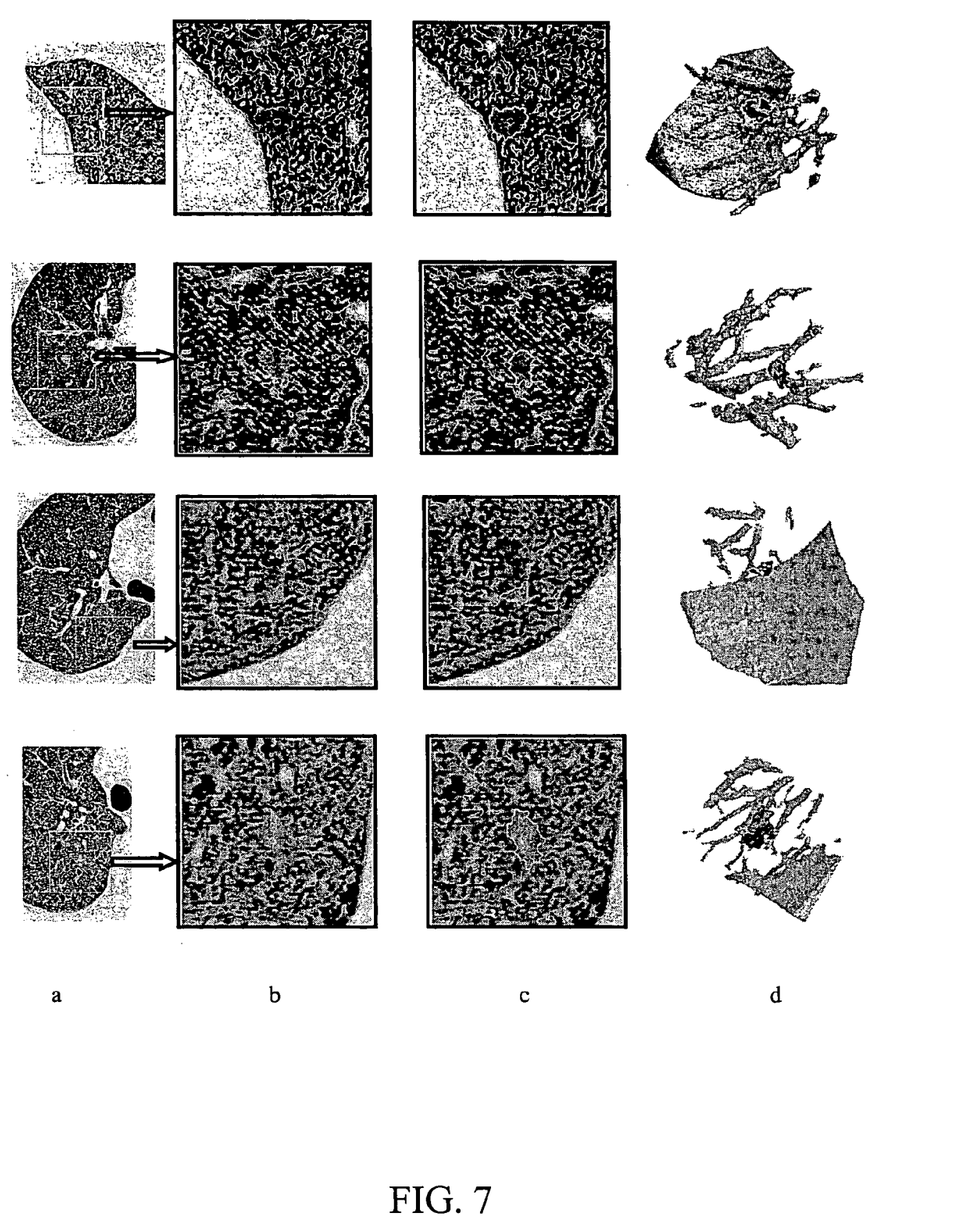
FIG. 7 illustrates several GGNs before and after performing GGN segmentation according to an exemplary embodiment of the present invention.

FIG. 3 is a flowchart showing an operation of a method for GGN segmentation according to an exemplary embodiment of the present invention. As shown in FIG. 3, 3D data is acquired from a lung or pair of lungs (step 310). This is accomplished by using the scanning device 205, for example an HRCT scanner, to scan a lung thereby generating a series of 2D images associated with the lung. The 2D images of the lung may then be converted or transformed into a 3D rendered image as shown for example in column (a) of FIG. 7.

After the 3D data is acquired from the lung, a GGN is selected (step 320). This is accomplished, for example, by a medical professional such as a radiologist manually selecting a GGN from the data, or by using a computer-aided GGN detection and/or characterization technique. As an alternative, in step 320, a point in or near the GGN may be selected. This process may also be performed manually by a radiologist examining the data associated with the lung or pair of lungs, or automatically by a computer programmed to identify points in GGNs in medical image data.

After the GGN is selected, a VOI is defined using the VOI selector 245 (step 330). In this step, the size and/or shape of the VOI is defined automatically to include the GGN. An example VOI is indicated by the area within a square box positioned around a GGN in column (a) of FIG. 7. A zoomed-in view of the VOI is shown in column (b) of FIG. 7. Next, preprocessing of the VOI is performed. Specifically, a chest wall is removed from the VOI (step 340). Thus, for example, a portion of the VOI that belongs to the chest wall is excluded from the VOI. This is accomplished by performing a region growing to remove an area in the VOI that belongs to the chest wall. Thus, the chest wall's potential influence on further processing techniques, such as MRF segmentation (discussed below), is removed.

Figure 4:
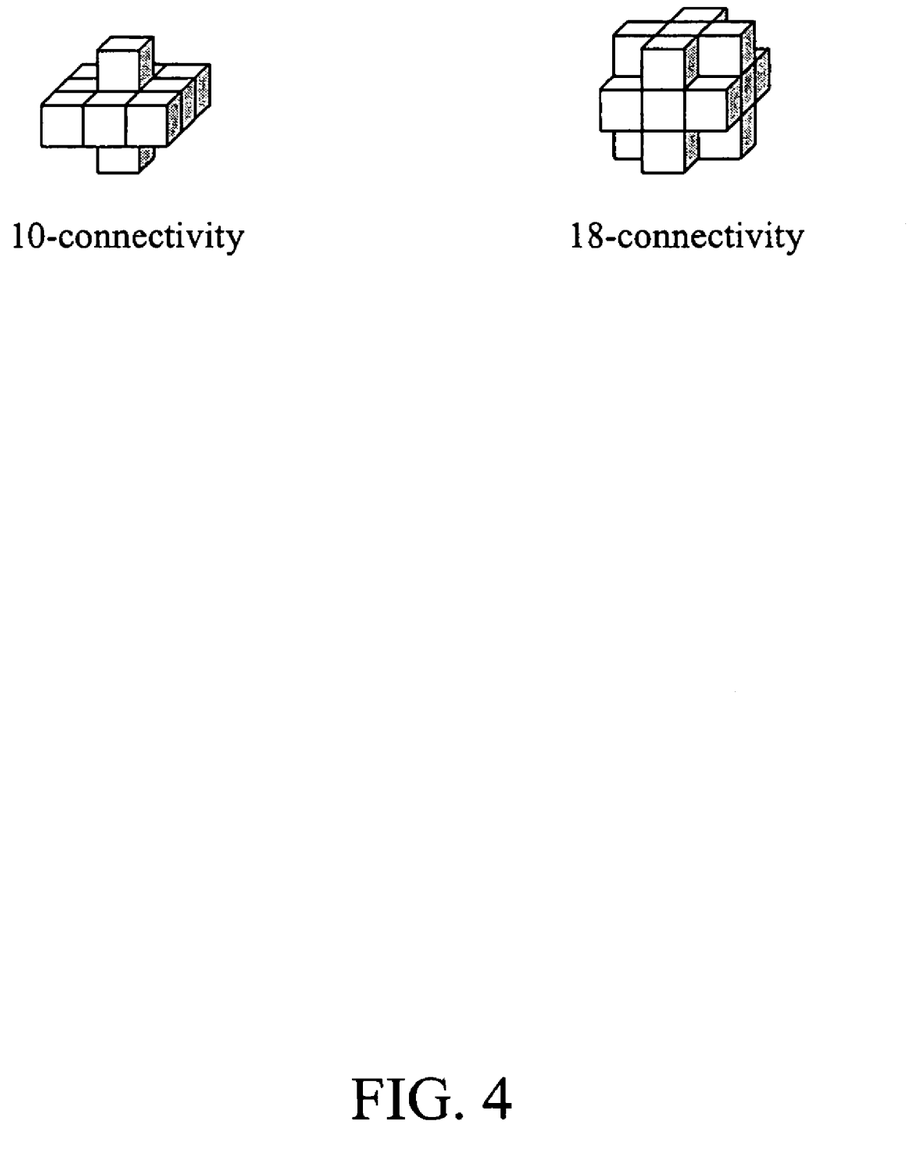
FIG. 4 illustrates connectivity types used during a region growing according to an exemplary embodiment of the present invention.

Next, the VOI (with the chest wall removed) is segmented (step 350). This is performed using, for example, a region growing where a seed point for the region growing is a point in the VOI that is either in or near the GGN. An example of the connectivity types that may be used during the region growing are shown in FIG. 4. For example, when pixel and slice spacings ($X_{res}$ and $Z_{res}$, respectively) satisfy the condition for 10-connectivity as shown below in Equation 1 (where d is a predefined distance constant), the 10-connectivity region growing is performed as shown in FIG. 4. Similarly, when the predefined distance d constant satisfies the condition for 18-connectivity shown in Equation 1, an 18-connectivity region growing is performed as shown in FIG. 4.

$$\begin{cases} \left[\left(\frac{X_{res}}{Z_{res}}\right)^2 + 1.0\right]^{1/2} < d \Rightarrow 10\text{-connectivity} \\ \left[\left(\frac{X_{res}}{Z_{res}}\right)^2 + 1.0\right]^{1/2} \geq d \Rightarrow 18\text{-connectivity} \end{cases} \quad [1]$$

It is to be understood that a variety of additional segmentation techniques may be used in step 350 such as, a histogram analysis based thresholding, Gaussian smoothing, edge detection, and template matching. It is to be further understood that step 350 is performed to obtain an initial segmentation state for an iterated condition mode (ICM) procedure to be performed in step 360 discussed below.

After segmenting the VOI in step 350, the VOI is again segmented using a Markov random field (MRF) (step 360). An MRF, which specifies a nonlinear interaction between similar and different features, is used for example, to combine and organize spatial and temporal information by introducing generic knowledge about features to be estimated. For example, by applying an MRF in step 360, the MRF gives an a priori probability by applying spatial constraints from neighboring voxels in the VOI. A label can then be assigned to each voxel in the VOI by taking into account intensity and spatial constraints from neighboring voxels. Thus, GGNs can be given one label type and non-GGNs or background information, for example, lung parenchyma, blood vessels, chest wall portions, etc. are given another label type. Thereby allowing the VOI segmented using MRF to be displayed discretely illustrating the GGNs and the background as shown, for example, in column (c) of FIG. 7, where an area denoted by a jagged edge in the center of the images illustrates the GGNs and the extraneous area is the background.

The MRF segmentation procedure of step 360 is derived and performed as follows. First, let $\Omega \subset R^3$ denote the VOI, then consider the intensity of the VOI as a random field $F(\bar{x})$, where $\bar{x} \in \Omega$. Next, let l denote the segmentation label for a voxel $\bar{x}$, and $l \in L = \{GGN, background\}$. A posteriori probability P(L|F) for labeling the GGNs and the background information is then obtained from the conditional intensity probability P(F|L) and a priori probability P(L) using Bayes' theorem as shown below in Equation 2.

$$P(L|F) \propto P(F|L)P(L) \quad [2]$$

Therefore, the statistical optimal labeling for the MRF segmentation is given by the maximum of a posteriori (MAP).

The conditional probabilities P(F|L) shown above are obtained from GGN and background intensity distributions, which are both modeled by a Gaussian distribution as shown below in Equation 3, $$P(F = f | L = l) = \frac{1}{\sqrt{2\pi}\,\sigma} \exp\left[-\frac{1}{2\sigma^2}(f - \mu_l)^2\right] \quad [3]$$

where $\mu_l$ is the mean value for the GGN or background intensity.

Figure 5:
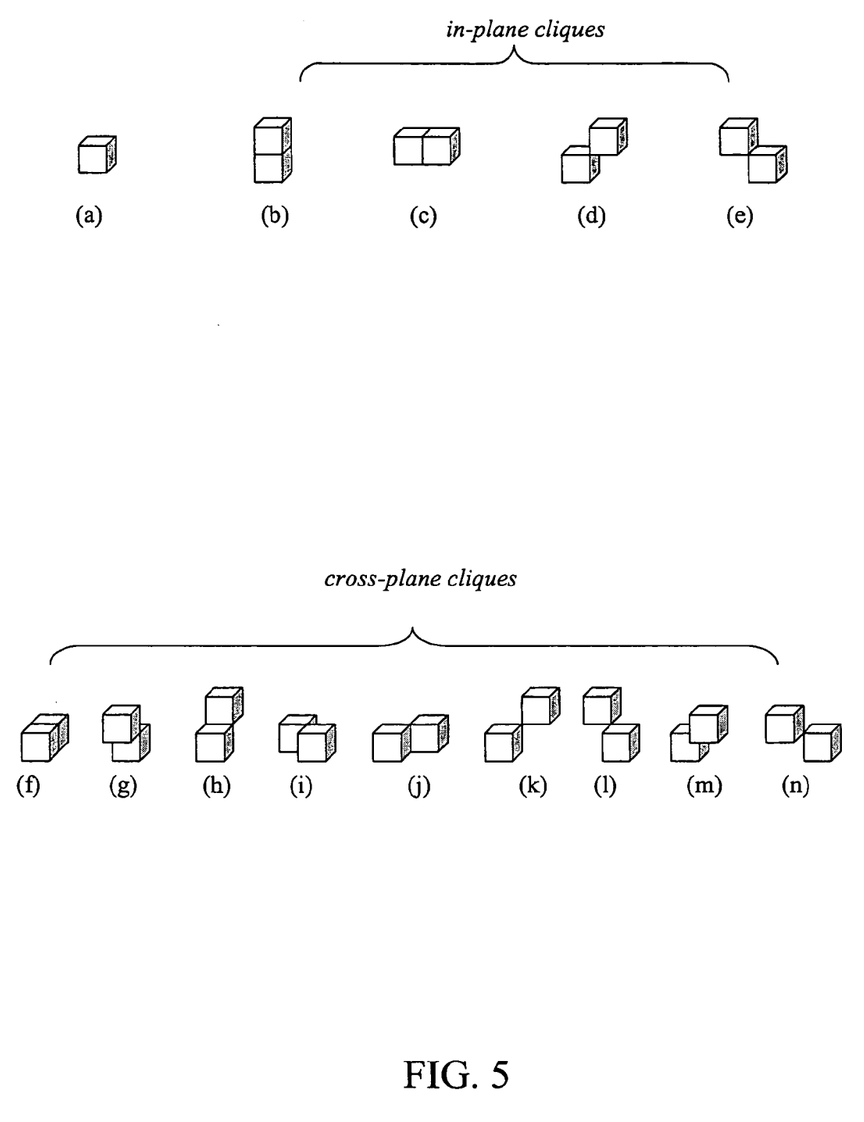
FIG. 5 illustrates a series of cliques used during a region growing according to an exemplary embodiment of the present invention.

Assuming that the segmentation labeling L is an MRF, then a priori probability P(L) is given by a Gibbs distribution as shown below in Equation 4, $$P(L=l) \propto \exp[-U(l)], \quad [4]$$

where the energy function $$U(l) = \sum_{c \in C} V_c(l)$$

is the summation over the set C of all one- and two-pixel cliques defined by a 3D neighborhood of 26-connectivity, which is used to define cliques (shown in FIG. 5), discussed hereinafter with reference to Equation 7. The potential function $V_c(l)$ of a one-pixel clique $C_1$ is defined by Equation 5, $$V_c(l) = \alpha_1, \text{ if } l_{\bar{x}} = l \quad [5]$$

where $l_{\bar{x}}$ is the label for the current voxel $\bar{x}$. $\alpha_l$ indicates a priori probability of a particular label l, i.e., a smaller $\alpha_l$ implies the label l is preferred by the a priori probability and a larger $\alpha_l$ implies the label l is not preferred. The potential function $V_c(l)$ of a two-pixel clique $C \in C_2$ is defined by Equation 6, $$V_c(l) = \begin{cases} -\beta_k & \text{if } l_{\bar{x}} = l_{\overline{x_n}}, \text{ where } \{\bar{x}, \overline{x_n}\} \in C_2 \\ \beta_k \end{cases} \quad [6]$$

where $\overline{x_n}$ denotes, for example, a neighboring voxel in a two-pixel clique, and $\beta_k$ is designed based on the clique types shown in Equation 7, $$\beta_k = \begin{cases} \beta & \overline{x_n} \in \{4 \text{ edges on same slice}\} & (b)\text{-}(c) \\ \beta \exp(-w\sqrt{2} - 1.0) & \overline{x_n} \in \{4 \text{ corners on same slice}\} & (d)\text{-}(e) \\ \beta \exp[-w(Z_{res}/X_{res} - 1.0)] & \overline{x_n} \in \{2 \text{ centers on neighboring slices}\} & (f) \\ \beta \exp\left[-w\left(\sqrt{(Z_{res}/X_{res})^2 + 1.0} - 1.0\right)\right] & \overline{x_n} \in \{8 \text{ edges on neighboring slices}\} & (g)\text{-}(j) \\ \beta \exp\left[-w\left(\sqrt{(Z_{res}/X_{res})^2 + 2.0} - 1.0\right)\right] & \overline{x_n} \in \{8 \text{ corners on neighboring slices}\} & (k)\text{-}(n) \end{cases} \quad [7]$$

where (b), (c), . . . , (n) are the in-plane (e.g., b-e) and cross-plane (e.g., f-n) cliques as shown in FIG. 5, $\beta$ is a predefined potential constant, and w is a weighting constant. $\beta_k$ is smaller when the distance between two pixels of a clique is larger, and larger when the distance between two pixels of a clique is smaller.

After determining the conditional probabilities using Equation 3 and the a priori probability P(L) using Equation 4, the resulting data from Equations 3 and 4 is inserted into Equation 2 to calculate the posteriori probability P(L|F) for labeling the GGNs and the background information. The optimization of the MAP then becomes the minimization process shown below in Equation 8.

$$MAP = \operatorname*{argmin}_{L}\left[U(L) + \frac{1}{2\sigma^2}(F - \mu_L)\right] \quad [8]$$

where $L = \{l \mid GGN, \text{background}\}$.

The MAP of Equation 8, which is the final segmentation result, is then determined by the ICM procedure. The ICM procedure, which begins from an initial state (e.g., iteration 0) that was determined by the region growing in step 350, assigns a label $l_{\bar{x}}(i)$ to voxel $\bar{x}$ on each iteration i in Equation 9, $$l_{\bar{x}}(i) = \operatorname*{argmin}_{l \in \{g,b\}}\left\{U(g, i-1) + \frac{1}{2\sigma^2}[f(\bar{x}) - \mu_g],\right.$$

$$\left. U(b, i-1) + \frac{1}{2\sigma^2}[f(\bar{x}) - \mu_b]\right\} \quad [9]$$

where U(g,i−1) and U(b,i−1) are energy values calculated from the labeling state of iteration i−1 for GGN and background labels, respectively. $f(\bar{x})$ is the intensity value for voxel $\bar{x}$, and $\mu_g$ and $\mu_b$ are the mean intensity values for the GGN and background labels, respectively.

Figure 6:
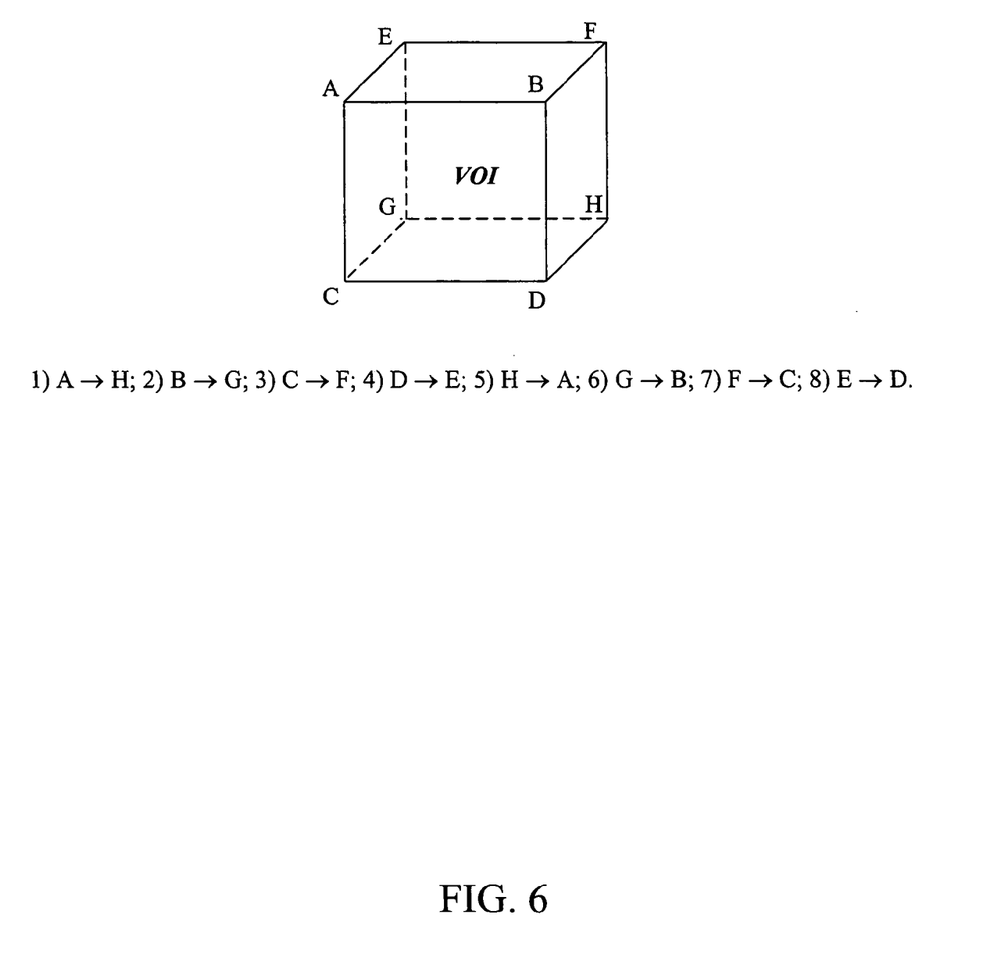
FIG. 6 illustrates an order of a raster scan used by an iterated conditional mode (ICM) according to an exemplary embodiment of the present invention.

During each ICM iteration a raster scan of the VOI is performed, and thus the voxels in the VOI are given a GGN or a background label. As shown in FIG. 6, voxel labeling is updated by performing a raster scan in eight different ways: (1) from the upper-left-front corner (A) to the lower-right-back corner (H) of the VOI; (2) from the upper-right-front corner (B) to the lower-left-back corner (G) of the VOI; (3) from the lower-left-front corner (C) to the upper-right-back corner (F) of the VOI; (4) from the lower-right-front corner (D) to the lower-right-back corner (E) of the VOI; (5) from the lower-right-back corner (H) to the upper-left-front corner (A) of the VOI; (6) from the lower-left-back corner (G) to the upper-right-front corner (B) of the VOI; (7) from the upper-right-back corner (F) to the lower-left-front corner (C) of the VOI; and (8) from the upper-left-back corner (E) to the lower-right-front corner (D) of the VOI.

The above process (where for each ICM iteration the raster scan is performed in one of the eight ways) is repeated until a convergence is observed. In other words, the above process is repeated until all of the voxels in the VOI are labeled. It is to be understood that alternative raster scan procedures having a different number of scan orders and/or sequences can be used in the above process.

After the VOI has been segmented using the Markov random field in step 360, the segmented VOI can undergo further processing (step 370). In particular, blood vessels attached to or near the GGN are removed from the segmented VOI by performing a shape analysis. An example of this is observed in column (c) of FIG. 7 where blood vessels that were attached to the GGNs were removed. The blood vessels are removed from the GGNs and/or the VOI, for example, by first identifying the blood vessels attached to or near the GGN by performing a thresholding and a compactness measurement to distinguish the blood vessels from the GGN, and then removing the blood vessels that are attached to or near the GGN and smoothing the results by applying a series of morphological operations. The technique of removing blood vessels from GGNs in a VOI is disclosed in U.S. Provisional Application No. 60/503,602, filed Sep. 17, 2003, entitled, "Improved GGO Nodule Segmentation with Shape Analysis", a copy of which is herein incorporated by reference. Next, the GGN is displayed to a user via, for example, the display 265 of the operator's console 215 (step 380). An example of GGNs being displayed after MRF segmentation in accordance with the present invention has been performed is illustrated in column (d) of FIG. 7 where dark portions in the center of the images are the GGNs.

Thus, by performing MRF segmentation according to the present invention, GGNs in medical images are accurately and quickly distinguished from background information by assigning labels to their associated voxels, thereby enabling GGNs to be visualized by a medical expert for diagnosing and evaluating certain lung ailments.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for ground glass nodule (GGN) segmentation, comprising:
    selecting a point in a medical image, wherein the point is located in a GGN;
    defining a volume of interest (VOI) around the point, wherein the VOI comprises the GGN;
    removing a chest wall from the VOI;
    obtaining an initial state for a Markov random field; and
    segmenting the VOI, wherein the VOI is segmented using the Markov random field.

2. The method of claim 1, further comprising:
    acquiring the medical image.

3. The method of claim 2, wherein the medical image is acquired using a computed tomographic (CT) imaging technique.

4. The method of claim 1, wherein the point is automatically selected.

5. The method of claim 1, wherein the point is manually selected.

6. The method of claim 1, further comprising:
    detecting the GGN using a computer-aided GGN detection technique.

7. The method of claim 1, further comprising:
    detecting the GGN manually.

8. The method of claim 1, wherein the GGN is one of a pure GGN and a mixed GGN.

9. The method of claim 1, wherein the chest wall is removed by performing a region growing.

10. The method of claim 1, further comprising:
    defining one of a shape and a size of the VOI.

11. The method of claim 1, wherein the initial state for the Markov random field is obtained by performing a region growing on the VOI after the chest wall is removed.

12. The method of claim 1, wherein the step of segmenting the VOI using the Markov random field comprises:
    defining a posteriori probability for the VOI; and
    labeling each pixel in the VOI using a maximum of the posteriori probability, wherein each pixel in the VOI is labeled as one of a GGN and a background.

13. The method of claim 12, wherein the defined posteriori probability is computed by $P(L|F) \propto P(F|L)P(L)$.

14. The method of claim 12, wherein the step of labeling each pixel is computed by $$L_x(i) = \mathop{\mathrm{argmin}}_{l \in \{g,b\}} \left\{ U(g, i-1) + \frac{1}{2\sigma^2}[f(\bar{x}) - \mu_g], U(b, i-1) + \frac{1}{2\sigma^2}[f(\bar{x}) - \mu_b] \right\}.$$

15. The method of claim 12, wherein the labeling comprises:
    scanning the VOI until a convergence is reached.

16. The method of claim 1, further comprising:
    performing a shape analysis to remove blood vessels attached to or near the GGN after the VOI has been segmented using the Markov random field.

17. The method of claim 1, further comprising:
    displaying the VOI segmented using the Markov random field.

18. A system for ground glass nodule (GGN) segmentation, comprising:
    a memory device for storing a program;
    a processor in communication with the memory device, the processor operative with the program to:
    define a volume of interest (VOI) around a GGN using data associated with a medical image of a lung;
    remove a chest wall from the VOI;
    obtain an initial state for a Markov random field; and
    segment the VOI, wherein the VOI is segmented using the Markov random field.

19. The system of claim 18, wherein the processor is further operative with the program code to:
acquire the medical image, wherein the medical image is acquired using a computed tomographic (CT) imaging technique.

20. The system of claim 18, wherein the chest wall is removed by performing a region growing.

21. The system of claim 18, wherein the initial state for the Markov random field is obtained by performing a region growing on the VOI after the chest wall is removed.

22. The system of claim 18, wherein the processor is further operative with the program code when segmenting the VOI using the Markov random field to:
define a posterirori probability for the VOI; and
label each pixel in the VOI using a maximum of the posteriori probability, wherein each pixel in the VOI is labeled as one of a GGN and a background.

23. The system of claim 22, wherein the defined posteriori probability is computed by $$P(L|F) \propto P(F|L)P(L).$$

24. The system of claim 22, wherein the step of labeling each pixel is computed by $$l_{\bar{x}}(i) = \operatorname*{argmin}_{l \in \{g,b\}} \left\{ U(g, i-1) + \frac{1}{2\sigma^2}[f(\bar{x}) - \mu_g], U(b.i-1) + \frac{1}{2\sigma^2}[f(\bar{x}) - \mu_b] \right\}.$$

25. The system of claim 18, wherein the processor is further operative with the program code to:
perform a shape analysis to remove blood vessels attached to the GGN in the VOI segmented using the Markov random field.

26. The system of claim 18, wherein the processor is further operative with the program code to:
display the VOI segmented using the Markov random field, wherein the GGN is visible.

27. A computer program product comprising a computer useable medium having computer program logic recorded thereon for ground glass nodule (GGN) segmentation, the computer program logic comprising:
program code for selecting a point in a medical image, wherein the point is located in or near a GGN;
program code for defining a volume of interest (VOI) around the point, wherein the VOI comprises the GGN;
program code for removing a chest wall from the VOI;
program code for obtaining an initial state for a Markov random field; and
program code for segmenting the VOI, wherein the VOI is segmented using the Markov random field.

28. A system for ground glass nodule (GGN) segmentation, comprising:
means for selecting a point in a medical image, wherein the point is located in a GGN;
means for defining a volume of interest (VOI) around the point, wherein the VOI comprises the GGN;
means for removing a chest wall from the VOI;
means for obtaining an initial state for a Markov random field; and
means for segmenting the VOI, wherein the VOI is segmented using the Markov random field.

29. A method for ground glass nodule (GGN) segmentation in pulmonary computed tomographic (CT) volumes using a Markov random field, comprising:
selecting a GGN from data associated with a pulmonary CT volume;
defining a volume of interest (VOI) around the GGN;
removing a chest wall from the VOI by performing a region growing on the VOI;
obtaining an initial state for an iterated condition mode (ICM) procedure by segmenting the VOI after the chest wall is removed; and
segmenting the VOI using a Markov random field, wherein the segmentation comprises:
defining a posteriori probability for the VOI; and
performing the ICM procedure, wherein the ICM procedure comprises labeling each pixel in the VOI using a maximum of the posteriori probability, wherein each pixel in the VOI is labeled as one of a GGN and a background until each pixel in the VOI is labeled.

30. The method of claim 29, wherein the defined posteriori probability is computed by $$P(L|F) \propto P(F|L)P(L).$$

31. The method of claim 29, wherein the step of labeling each pixel during the ICM procedure is computed by $$l_{\bar{x}}(i) = \operatorname*{argmin}_{l \in \{g,b\}} \left\{ U(g, i-1) + \frac{1}{2\sigma^2}[f(\bar{x}) - \mu_g], U(b.i-1) + \frac{1}{2\sigma^2}[f(\bar{x}) - \mu_b] \right\}.$$

32. The method of claim 29, wherein the ICM procedure begins from the initial state.

* * * * *